Patented Jan. 1, 1929.

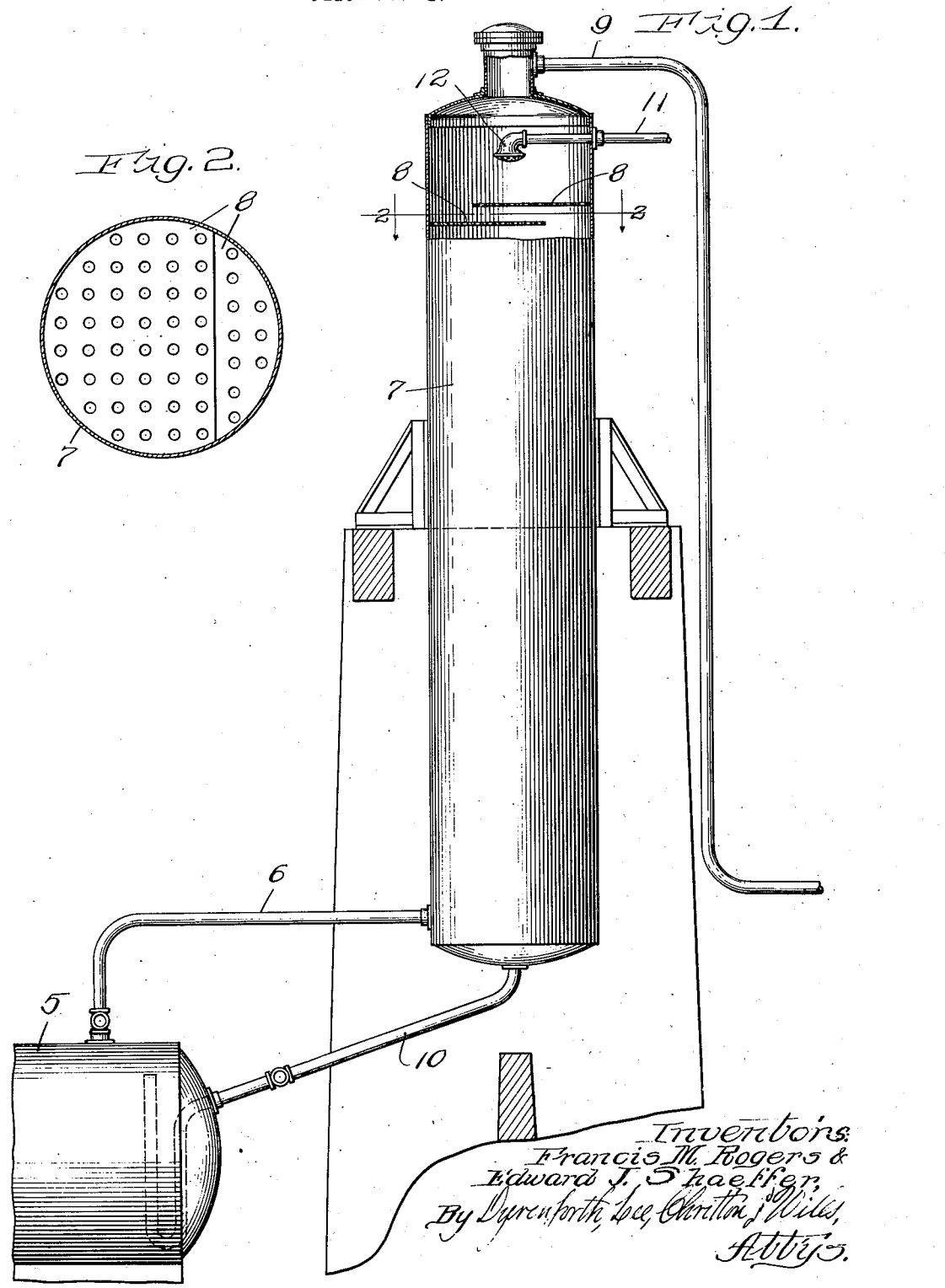

1,697,573

UNITED STATES PATENT OFFICE.

FRANCIS M. ROGERS AND EDWARD J. SHAEFFER, OF WHITING, INDIANA, ASSIGNORS TO STANDARD OIL COMPANY, OF CHICAGO, ILLINOIS, A CORPORATION OF INDIANA.

PRESSURE DISTILLATION OF HYDROCARBON OILS.

Application filed November 17, 1922, Serial No. 601,485, and in Canada May 26, 1924.

This invention relates to improvements in methods for the pressure distillation of hydrocarbon oils for the production of lower boiling point products, for example, of the nature of gasoline, and will be fully understood from the following description, illustrated by the accompanying drawings, in which Figure 1 shows, in part diagrammatically, apparatus suitable for carrying this invention into effect.

Figure 2 is a transverse sectional view through the dephlegmating or reflux tower shown in Fig. 1 on line 2—2 of the latter figure.

In the apparatus illustrated, the numeral 5 indicates the end of a suitable container or still in which the hydrocarbon oil to be subjected to the process is brought to a conversion temperature under the prevailing pressure conditions.

From the still 5, the vapor line 6 leads to a reflux or dephlegmating device 7, which may be of any suitable construction. In the apparatus illustrated, it is shown as a screen baffle tower, in which are arranged a series of transverse screen baffles 8, which extend partially across the tower. The tower may be exposed or may be provided with a heat insulating coating as desired, the latter form being preferred. From the reflux device 7 uncondensed vapors pass out through the vapor pipe 9. The reflux device 7 is maintained under the same pressure as that prevailing in the still 5. In practicing the present invention, the pressure upon the apparatus may be relieved beyond the condenser, as shown in the patent of William M. Burton, 1,049,667, of January 7, 1913 or it may be relieved between the reflux device and the condenser, as more fully described in the patent to Humphreys and Burton, 1,343,674, of June 15, 1920.

The condensate or reflux formed in the dephlegmator 7 is returned to the still through the run-back line 10. Oil is pumped into the reflux device, preferably near the top, in the manner more fully hereinafter described, through the pumping-in line 11, which is provided within the dephlegmator with a suitable distributing device or spray head 12.

In carrying out the present process, the still 5 is charged with the hydrocarbon oil to be distilled, which is first gradually heated at atmospheric pressure until any water present in the oil has been removed as "drips". The system is then placed under its operating pressure by the introduction of any suitable inert gas, which may suitably be flue gas, or the incondensible gases from other similar stills operating under pressure, for example, in the manner described in the patent to E. M. Clark, 1,129,034, of February 16, 1915. In this manner, the distillation of the hydrocarbon oil before it reaches its proper operating temperature is prevented. When the operating temperature is reached, the vapors evolved from the still 5 pass through the vapor line 6 into the dephlegmator 7, in which products having a higher boiling point than the desired distillate products are condensed and returned to the still through the run-back line 10. The uncondensed vapors of the desired low-boiling products pass out of the dephlegmator 7 through the vapor line 9 to a suitable condensing system (not shown) in which the desired products are condensed. At the same time, a hydrocarbon oil having characteristics closely similar to the low boiling products thus condensed is pumped into the dephlegmator through the pumping in line 11, these products being substantially completely vaporized in the dephlegmator 7 and their vapors passing out together with the vapors of the desired low-boiling products evolved from the still 5. The proportion of the low-boiling oil thus introduced into the dephlegmator 7 may vary upwardly from an amount equal to the amount of low-boiling product produced within the still 5 within wide limits, say up to 4 or 5 times the amount so produced. The application of heat to the still 5 is controlled to cause the evolution of the desired volume of low-boiling products. It has been uniformly found that the greater the proportion of low-boiling oil pumped into the reflux device in the manner described, the greater is the proportion of low boiling products evolved from the still.

When it is desired to feed into the still during its operation, stock of a character similar to the stock charged into the still; that is, stock heavier than the desired low boiling products, this feed stock may be supplied through the same pumping-in-line 11 or may be pumped directly into the still.

As a specific example of the operation of the present process, the following may be given. The still 5 is charged with a petroleum oil having a boiling point range of say from 450 to 750° F. and a Beaumé gravity of about 30°. The distillation is conducted under a pressure of 5 to 6 atmospheres for the production of a distillate having an end boiling point of about 450° and consisting largely of gasoline. A still of about ten thousand gallons charging capacity may be operated under these conditions to produce about two hundred gallons of such distillate per hour. A hydrocarbon oil similar to the distillate and preferably, after operating conditions have been established, a part of the distillate itself is pumped into the dephlegmator 7 through the line 11. Under these conditions, with two hundred gallons of such distillate evolved per hour from the still, when two hundred gallons per hour are pumped in through the line 11, a distillate having an end point of 450°, 58% of which boils off at 374° F., is obtained. When 250 gallons of the distillate are pumped in per hour, the evolved distillate has an end point of 440 to 445° F. and contains approximately 60% boiling off at 374° F. When three hundred gallons per hour of the distillate are pumped into the line 11, a distillate having an end point of 430 to 435° F. is obtained containing above 70% boiling off at 374° F. Further increases in the proportion of the product boiling off at 374° are obtained by increasing the proportion of distillate pumped into the line 11. It will be understood, of course, that substantially the entire amount of distillate so pumped in is vaporized and passes out of the system with the vapors of the low-boiling products formed in the still and the amount of distillate actually produced is calculated with the deduction for the proportion of distillate introduced through the line 11.

We claim:

1. A method of distilling hydrocarbon oil for the formation of low-boiling products, which consists in heating such oil under pressure to a conversion temperature, introducing into the vapors evolved by the oil, liquid hydrocarbon oil having approximately the characteristices of the desired products, removing the vapors of the desired products together with the vapors of the oil introduced and returning to the oil undergoing heating condensed products of a higher boiling point than the desired products.

2. A method of distilling hydrocarbon oil for the formation of low boiling products, which consists in heating such oil under pressure to a conversion temperature, introducing into the vapors evolved by the oil, liquid hydrocarbon oil having approximately the characteristics of the desired products evolved from the oil, in amount at least equal to the amount of such evolved products, removing vapors of the desired products together with the vapors of the oil introduced and returning to the oil undergoing heating condensed products of a higher boiling point than the desired products.

3. A method of distilling hydrocarbon oil for the formation of low-boiling products which consists in heating such oil under pressure to a conversion temperature, introducing into the vapors evolved by the oil, a liquid hydrocarbon oil substantially identical with the desired low-boiling products evolved from the still and previously produced therein, removing the vapors of the desired products, together with the vapors of the oil introduced and returning to the oil undergoing heating condensed products of a higher boiling point than the desired low-boiling product.

4. A method of distilling hydrocarbon oil for the formation of a gasoline-containing distillate which consists in heating a body of oil having a boiling point range between 450 and 750° F. under a pressure of 5 to 6 atmospheres to a distillation temperature, introducing into the vapors evolved by the oil while under such pressure, gasoline-containing distillate having approximately the characteristics of the gasoline-containing distillate produced from said oil, removing the vapors of the desired product together with the vapors of the oil introduced and returning to the body of oil condensed products of a higher boiling point than the desired products.

FRANCIS M. ROGERS.
EDWARD J. SHAEFFER.